United States Patent
Akiyama (10) Patent No.: US 8,879,790 B2
(45) Date of Patent: Nov. 4, 2014

(54) IMAGE PROCESSING DEVICE AND DROWSINESS ASSESSMENT DEVICE

(75) Inventor: Tomonori Akiyama, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/386,503

(22) PCT Filed: Feb. 22, 2010

(86) PCT No.: PCT/JP2010/052644
§ 371 (c)(1),
(2), (4) Date: Jan. 23, 2012

(87) PCT Pub. No.: WO2011/101990
PCT Pub. Date: Aug. 25, 2011

(65) Prior Publication Data
US 2012/0308079 A1 Dec. 6, 2012

(51) Int. Cl.
*G06K 9/00* (2006.01)
(52) U.S. Cl.
CPC .......... *G06K 9/0061* (2013.01); *G06K 9/00845* (2013.01)
USPC ........................................ 382/103
(58) Field of Classification Search
USPC ................ 382/103–104, 107, 117–118; 340/573.3, 575, 576
See application file for complete search history.

(56) References Cited

U.S. PATENT DOCUMENTS

| 2006/0204042 A1* | 9/2006 | Hammoud et al. ........... 382/107 |
| 2008/0212850 A1 | 9/2008 | Adachi et al. |
| 2009/0027212 A1* | 1/2009 | Nakagoshi et al. ........... 340/575 |

FOREIGN PATENT DOCUMENTS

| DE | 10 2008 040 709 | 2/2009 |
| JP | 2001-43382 | 2/2001 |
| JP | 2007-213377 | 8/2007 |
| JP | 2008-192100 | 8/2008 |
| JP | 2008-224589 | 9/2008 |
| JP | 2008-226106 | 9/2008 |
| JP | 2009-28237 | 2/2009 |
| JP | 2009-219555 | 10/2009 |

OTHER PUBLICATIONS

International Search Report in International Application No. PCT/JP2010/052644; Mailing Date: Mar. 16, 2010.

* cited by examiner

*Primary Examiner* — Amara Abdi
(74) *Attorney, Agent, or Firm* — Finnegan, Henderson, Farabow, Garrett & Dunner, LLP (57) ABSTRACT

An object of the present invention is to reduce false detection of an eyelid from a face image. According to the present invention, it is determined whether the amount of the change in the position of an eyelid outline candidate line during blinking matches the normal movement of an eyelid. When it is determined that the amount of the change in the position of the eyelid outline candidate line does not match the normal movement of the eyelid during blinking, the eyelid outline candidate line is not set as an eyelid outline. Therefore, it is possible to reduce false detection of the eyelid from the face image.

4 Claims, 9 Drawing Sheets

Fig.7

IMAGE PROCESSING DEVICE AND DROWSINESS ASSESSMENT DEVICE

CROSS-REFERENCE TO RELATED APPLICATIONS

This application is a national phase application of International Application No. PCT/JP2010/052644, filed Feb. 22, 2010, the contents of which are incorporated herein by reference.

TECHNICAL FIELD

The present invention relates to an image processing device that detects an eyelid outline from a face image, and a drowsiness assessment device, installed in a vehicle, that assesses the drowsiness of a driver.

BACKGROUND ART

In the past, devices have been known in which the drowsiness of a driver of a vehicle is detected, and issues a warning to the driver when drowsiness is detected. For example, Japanese Unexamined Patent Application Publication No. 2009-28237 discloses a device that estimates the drowsiness of a driver on the basis of the position of an eyelid detected from a face image of a driver of a vehicle. In addition, Japanese Unexamined Patent Application Publication No. 2007-213377 discloses a device that detects feature points of the upper and lower eyelids from a face image by image processing.

CITATION LIST

Patent Literature

Patent Literature 1: Japanese Unexamined Patent Application Publication No. 2009-28237
Patent Literature 2: Japanese Unexamined Patent Application Publication No. 2007-213377

SUMMARY OF INVENTION

Technical Problem

However, in devices in the related art, there may have been cases where, for example, the edge of the pupil is falsely detected as an eyelid outline. When drowsiness is estimated on the basis of the position of an eyelid which is falsely detected, there may be a case where it is determined that the eyelid is closed even though the eyelid is not closed. Thereby, false estimation of drowsiness occurs.

Consequently, the present invention is contrived in order to solve the above-mentioned problem, and an object thereof is to provide an image processing device capable of reducing the false detection of an eyelid from a face image, and to provide a drowsiness estimation device capable of preventing false estimation of drowsiness.

Solution to Problem

In one aspect of the present invention, there is provided an image processing device that detects an eyelid outline from a face image, including: eyelid outline detection means for detecting an eyelid outline candidate line which is a candidate of an eyelid outline from the face image; eyelid outline determination means for determining whether a predetermined condition which is previously set is satisfied with respect to the eyelid outline candidate line; and eyelid outline setting means for setting the eyelid outline candidate line as an eyelid outline, on the basis of a determination result of the eyelid outline determination means, wherein the eyelid outline determination means determines whether the amount of a change in the position of the eyelid outline candidate line during blinking, which is the time when a blink is detected, matches a normal movement of an eyelid during blinking, as the predetermined condition, and the eyelid outline setting means does not set the eyelid outline candidate line as the eyelid outline, when it is determined by the outline determination means that the amount of the change in the position of the eyelid outline candidate line does not match the normal movement of the eyelid during blinking.

According to the present invention, it is determined whether the amount of the change in the position of the eyelid outline candidate line during blinking matches the normal movement of the eyelid. When it is determined that the amount of the change in the position of the eyelid outline candidate line does not match the normal movement of the lower eyelid during blinking, there is a high possibility of the eyelid candidate line being something other than a falsely detected eyelid outline. In this case, since the eyelid outline candidate line is not set as the eyelid outline, it is possible to reduce false detection of the eyelid from the face image.

In addition, in the image processing device according to the present invention, the eyelid outline detection means may detect a lower eyelid outline candidate line which is a candidate of a lower eyelid outline, the eyelid outline determination means may determine whether the amount of a change in the position of the lower eyelid outline candidate line during blinking is a first predetermined value or more which is previously set, as the predetermined condition, and the eyelid outline setting means may not set the lower eyelid outline candidate line as the lower eyelid outline, when it is determined by the eyelid outline determination means that the amount of the change in the position of the lower eyelid outline candidate line is the first predetermined value or more.

During blinking, the lower eyelid hardly moves, or moves slightly. According to the present invention, it is determined whether the amount of the change in the position of the lower eyelid outline candidate line matches the normal movement of the lower eyelid during blinking, depending on whether the amount is the first predetermined value or more which is previously set. When it is determined that the amount of the change in the position of the lower eyelid outline candidate line is the first predetermined value or more, the lower eyelid outline candidate line is not set as the lower eyelid outline, and thus it is possible to reliably reduce false detection of the lower eyelid from the face image.

In addition, in the image processing device according to the present invention, the eyelid outline detection means may detect an upper eyelid outline candidate line which is a candidate of an upper eyelid outline, the eyelid outline determination means may determine whether the amount of a change in the position of the upper eyelid outline candidate line during blinking is a second predetermined value or more which is previously set, as the predetermined condition, and the eyelid outline setting means may not set the upper eyelid outline candidate line as the upper eyelid outline, when it is not determined by the eyelid outline determination means that the amount of the change in the position of the upper eyelid outline candidate line is the second predetermined value or more.

During normal blinking, the upper eyelid widely moves toward the lower eyelid. According to the present invention, it is determined whether the amount of the change in the position of the upper eyelid outline candidate line matches the normal movement of the upper eyelid during blinking, depending on whether the amount is the second predetermined value or more which is previously set. When it is not determined that the amount of the change in the position of the upper eyelid outline candidate line is the second predetermined value or more, the upper eyelid outline candidate line is not set as the upper eyelid outline, and thus it is possible to reliably reduce false detection of the upper eyelid from the face image.

In addition, in the image processing device according to the present invention, the eyelid outline determination means may detect a blink on the basis of a change in an eye opening degree, which is the distance between the upper eyelid outline candidate line and the lower eyelid outline candidate line. In this case, it is possible to perform reliable detection during blinking.

In another aspect of the present invention, there is provided a drowsiness assessment device, installed in a vehicle, that assesses the drowsiness of a driver, including: eyelid outline detection means for detecting an eyelid outline candidate line which is a candidate of an eyelid outline from the face image; eyelid outline determination means for determining whether a predetermined condition which is previously set is satisfied with respect to the eyelid outline candidate line; eyelid outline setting means for setting the eyelid outline candidate line as an eyelid outline, on the basis of a determination result of the eyelid outline determination means; and drowsiness estimation means for estimating the drowsiness of the driver, on the basis of a change in the positions of the upper eyelid outline and the lower eyelid outline which are set by the eyelid outline setting means, wherein the eyelid outline determination means determines whether the amount of a change in the position of the eyelid outline candidate line during blinking which is the time when the blink is detected matches a normal movement of an eyelid during blinking, as the predetermined condition, and the drowsiness estimation means does not estimate the drowsiness of the driver, when it is determined by the outline determination means that the amount of the change in the position of the eyelid outline candidate line does not match the normal movement of the eyelid during blinking.

According to the present invention, it is determined whether the amount of the change in the position of the eyelid outline candidate line during blinking matches the normal movement of the eyelid. When it is determined that the amount of the change in the position of the eyelid outline candidate line does not match the normal movement of the eyelid during blinking, there is a high possibility of the eyelid candidate line being something other than a falsely detected eyelid outline. In this case, since the drowsiness of the driver is not estimated, it is possible to prevent a false estimation of drowsiness.

In addition, in the drowsiness assessment device according to the present invention, the eyelid outline detection means may detect a lower eyelid outline candidate line which is a candidate of a lower eyelid outline, the eyelid outline determination means may determine whether the amount of a change in the position of the lower eyelid outline candidate line during blinking is a first predetermined value or more which is previously set, and the drowsiness estimation means may not estimate the drowsiness of the driver, when it is determined by the eyelid outline determination means that the amount of the change in the position of the lower eyelid outline candidate line is the first predetermined value or more.

During blinking, the lower eyelid hardly moves, or moves slightly. According to the present invention, it is determined whether the amount of the change in the position of the lower eyelid outline candidate line matches the normal movement of the lower eyelid during blinking, depending on whether the amount is the first predetermined value or more which is previously set. When it is determined that the amount of the change in the position of the lower eyelid outline candidate line is the first predetermined value or more, the drowsiness of the driver is not estimated, and thus it is possible to reliably prevent a false estimation of drowsiness.

In addition, in the drowsiness assessment device according to the present invention, the eyelid outline detection means may detect an upper eyelid outline candidate line which is a candidate of an upper eyelid outline, the eyelid outline determination means may determine whether the amount of a change in the position of the upper eyelid outline candidate line during blinking is a second predetermined value or more which is previously set, and the drowsiness estimation means may not estimate the drowsiness of the driver, when it is not determined by the eyelid outline determination means that the amount of the change in the position of the upper eyelid outline candidate line is the second predetermined value or more.

During normal blinking, the upper eyelid widely moves toward the lower eyelid. According to the present invention, it is determined whether the amount of the change in the position of the upper eyelid outline candidate line matches the normal movement of the upper eyelid during blinking, depending on whether the amount is the second predetermined value or more which is previously set. When it is not determined the amount of the change in the position of the upper eyelid outline candidate line is the second predetermined value or more, the drowsiness of the driver is not estimated, and thus it is possible to reliably prevent a false estimation of drowsiness.

In addition, in the drowsiness assessment device according to the present invention, the eyelid outline determination means may detect a blink on the basis of a change in an eye opening degree, which is the distance between the upper eyelid outline candidate line and the lower eyelid outline candidate line. In this case, it is possible to perform reliable detection during blinking.

Advantageous Effects of Invention

According to the present invention, it is possible to reduce false detection of the eyelid from the face image, and to prevent a false estimation of drowsiness.

DESCRIPTION OF EMBODIMENTS

Hereinafter, an embodiment of the present invention will be described in detail with reference to the accompanying drawings. Meanwhile, in the description of the drawings, the same components are denoted by the same reference numerals and signs, and the description thereof will be omitted.

Figure 1:
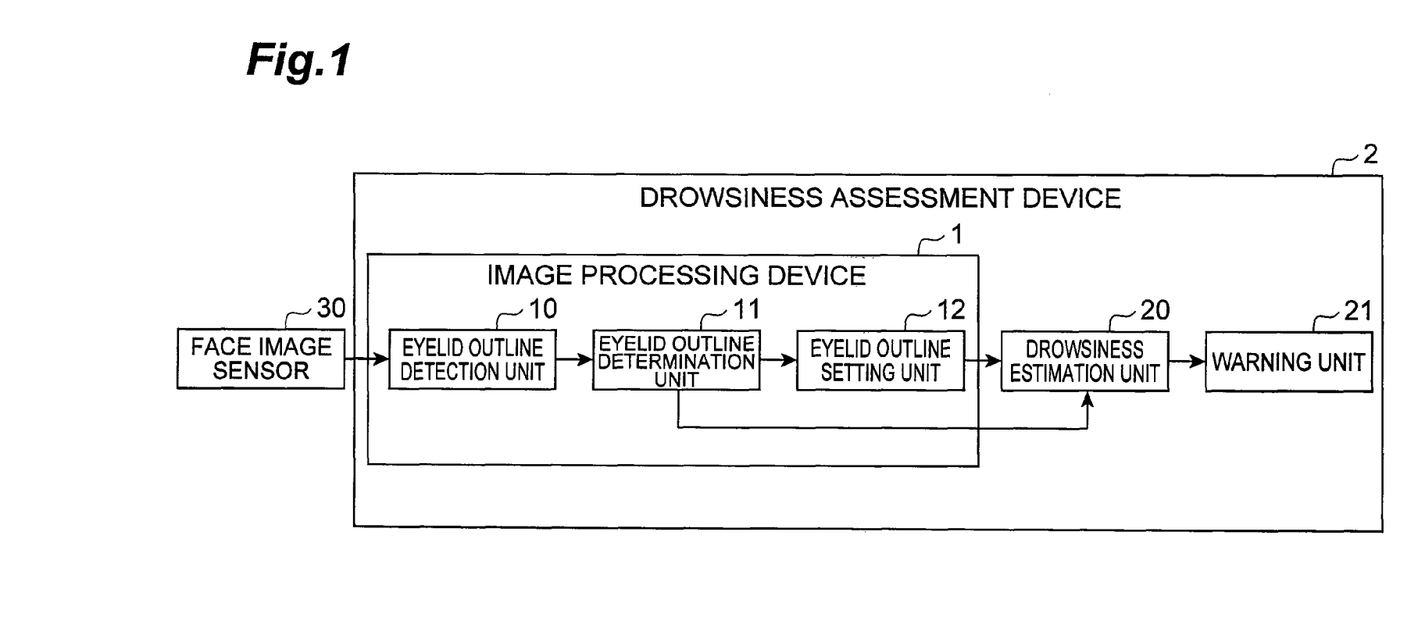
FIG. 1 is a schematic configuration diagram illustrating an image processing device according to an embodiment of the present invention and a drowsiness assessment device including the image processing device.

FIG. 1 is a schematic configuration diagram illustrating an image processing device according to the present embodiment and a drowsiness assessment device including the image processing device. An image processing device 1 according to the present embodiment is a device that detects an eyelid outline from a face image. In addition, a drowsiness assessment device 2 according to the present embodiment is a device, installed in a vehicle, that assesses the drowsiness of a driver.

As shown in FIG. 1, the drowsiness assessment device 2 includes the image processing device 1, drowsiness estimation unit 20 and a warning unit 21, and is connected to a face image sensor 30. In addition, the image processing device 1 includes an eyelid outline detection unit 10, an eyelid outline determination unit 11 and an eyelid outline setting unit 12.

The face image sensor 30 is a device that detects a face image of a driver of a vehicle. The face image sensor 30 sends out the detected face image to the image processing device 1.

Figure 2:
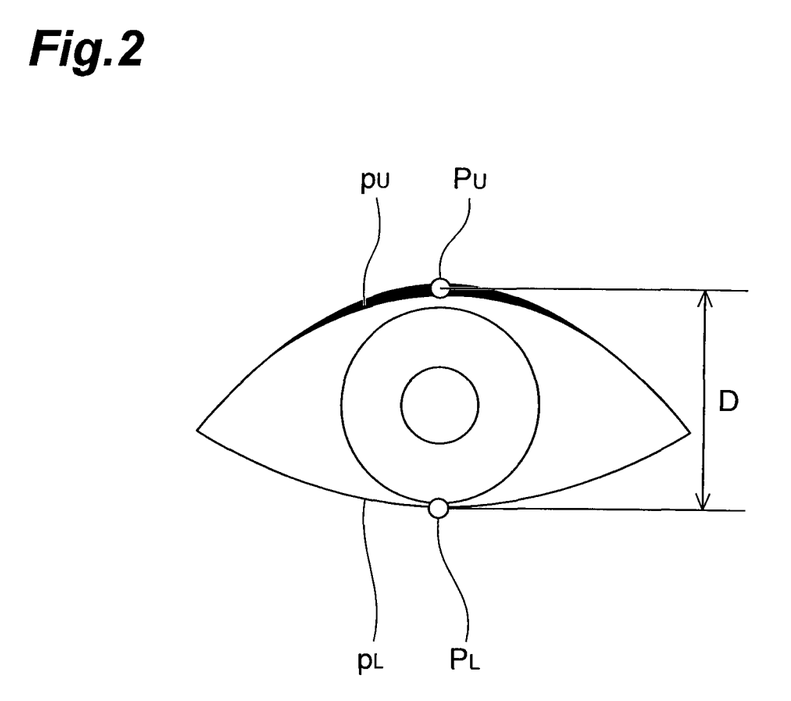
FIG. 2 is a schematic diagram illustrating an eye portion of a face image of a driver acquired by a face image sensor.

The eyelid outline detection unit 10 is a unit that detects the eyelid outline candidate line which is a candidate of the eyelid outline from the face image. The eyelid outline candidate line includes the upper eyelid outline candidate line which is a candidate of the upper eyelid outline and the lower eyelid outline candidate line which is a candidate of the lower eyelid outline. The eyelid outline detection unit 10 may detect any one of the upper eyelid outline candidate line and the lower eyelid outline candidate line. Reference will be made to FIG. 2 to describe detection processes of the upper eyelid outline candidate line and the lower eyelid outline candidate line. FIG. 2 is a schematic diagram illustrating an eye portion of a face image of a driver acquired by the face image sensor 30. The eyelid outline detection unit 10 extracts, for example, the boundary between the upper eyelid and the eyeball of a driver (hereinafter, referred to as the upper eyelid boundary) and the boundary between the lower eyelid and the eyeball thereof (hereinafter, referred to as the lower eyelid boundary) from the face image, respectively, by image processing, and detects the extracted upper eyelid boundary and the lower eyelid boundary, respectively, as the upper eyelid outline candidate line $p_U$ and the lower eyelid outline candidate line $p_L$.

The eyelid outline determination unit 11 is a unit that determines whether a predetermined condition which is previously set is satisfied with respect to the upper eyelid outline candidate line $p_U$ and the lower eyelid outline candidate line $p_L$. Specifically, the eyelid outline determination unit 11 determines whether the amount of the change in the position of the upper eyelid outline candidate line $p_U$ or the lower eyelid outline candidate line $p_L$ during blinking, which is the time when a blink is detected, matches the normal movement of the upper eyelid or the lower eyelid during blinking, as the predetermined condition.

In addition, the eyelid outline determination unit 11 can detect the blink on the basis of a change in the eye opening degree D which is a distance between the upper eyelid outline candidate line $p_U$ and the lower eyelid outline candidate line $p_L$. Meanwhile, as shown in FIG. 2, the eye opening degree D is obtained as a distance between the upper eyelid outline point $P_U$ which is a point near the central portion of the upper eyelid outline candidate line $p_U$ and the lower eyelid outline point $P_L$ which is a point near the central portion of the lower eyelid outline candidate line $p_L$.

Figure 3:
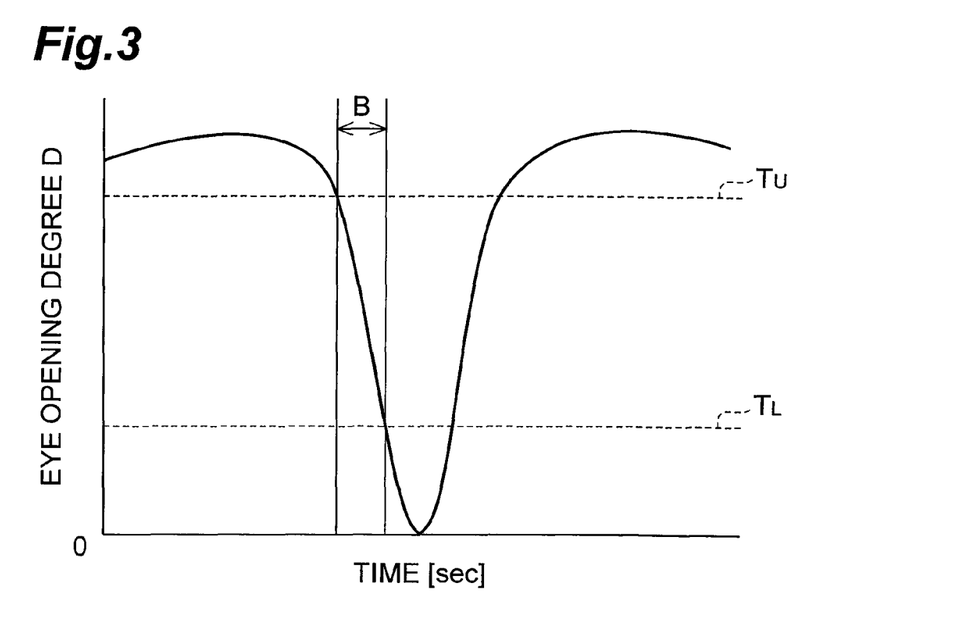
FIG. 3 is a diagram illustrating a change in the eye opening degree with respect to the time when a blink occurs.

A blink and the time of the blink will be described with reference to FIG. 3. FIG. 3 is a diagram illustrating a change in the eye opening degree D with respect to the time when a blink occurs. The eyelid outline determination unit 11 detects a change in the value of the eye opening degree D from the eye-opening threshold $T_U$ or more to the eye-closure threshold $T_D$ or less as a blink. The eyelid outline determination unit 11 defines the time when the eye opening degree D changes from the eye-opening threshold $T_U$ or more to the eye-closure threshold $T_D$ or less as the time of the blink B. Meanwhile, the value between the eye-opening threshold $T_U$ to the eye-closure threshold $T_D$ is a value which is previously set. Meanwhile, a determination process relevant to the upper eyelid outline candidate line and the lower eyelid outline candidate line through the eyelid outline determination unit 11 will be described later in detail.

The eyelid outline setting unit 12 is a unit that sets the eyelid outline candidate line as an eyelid outline on the basis of a determination result of the eyelid outline determination unit 11. That is, the eyelid outline setting unit 12 can set the upper eyelid outline candidate line and the lower eyelid outline candidate line as an upper eyelid outline and a lower eyelid outline, respectively. Specifically, when it is determined by the eyelid outline determination unit 11 that the amount of the change in the position of the lower eyelid outline candidate line does not match the normal movement of the lower eyelid during blinking, the eyelid outline setting unit 12 does not set the lower eyelid outline candidate line as the lower eyelid outline. In addition, when it is not determined by the eyelid outline determination unit 11 that the amount of the change in the position of the upper eyelid outline candidate line matches the normal movement of the upper eyelid during blinking, the eyelid outline setting unit 12 does not set the upper eyelid outline candidate line as the upper eyelid outline. Meanwhile, a setting process relevant to the upper eyelid outline and the lower eyelid outline through the eyelid outline setting unit 12 will be described later in detail.

The drowsiness estimation unit 20 is a unit that estimates the drowsiness of a driver on the basis of a change in the position of the eyelid outline set by eyelid outline setting means. Further, when it is determined by the eyelid outline determination unit 11 that the amount of the change in the position of the lower eyelid outline candidate line does not match the normal movement of the lower eyelid during blinking, or when it is not determined by the eyelid outline determination unit 11 that the amount of the change in the position of the upper eyelid outline candidate line matches the normal movement of the upper eyelid during blinking, the drowsiness estimation unit 20 according to the present embodiment does not estimate the drowsiness of the driver. Meanwhile, a drowsiness estimation process through the drowsiness estimation unit 20 will be described later in detail.

When it is estimated by the drowsiness estimation unit 20 that the driver feels drowsy, the warning unit 21 is unit that issues a warning to the driver through at least any one of the sense of hearing and the sense of sight. More specifically, when it is estimated that the driver feels drowsy, the warning unit 21 causes a display device (not shown) such as a display and a lamp or an alarming device (not shown) such as a speaker and a buzzer to perform a warning to the driver.

Figure 4:
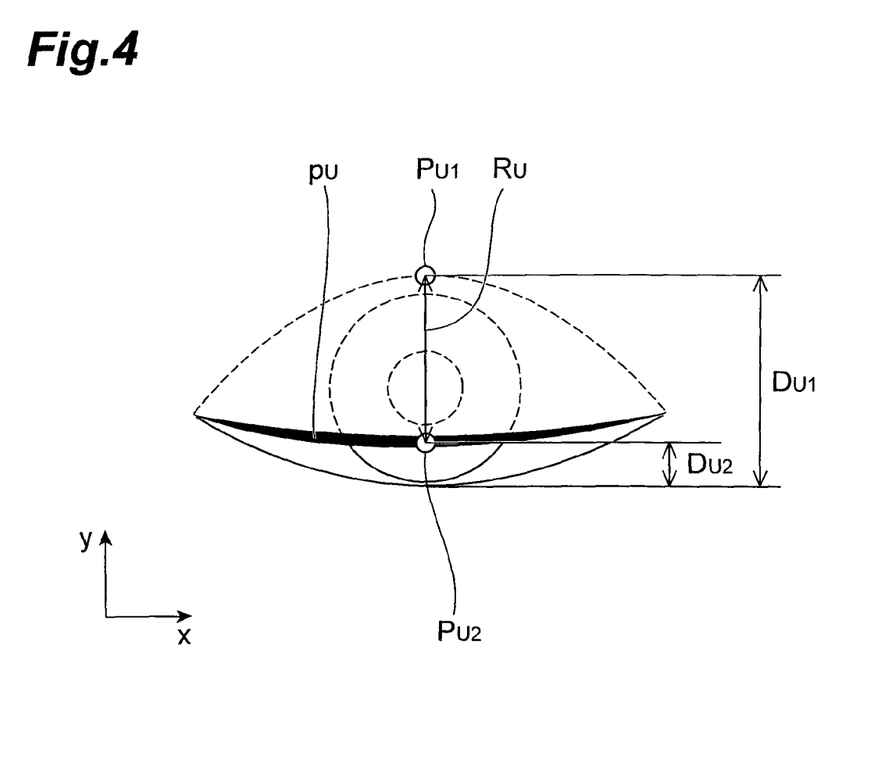
FIG. 4 is a schematic diagram illustrating a normal movement of an upper eyelid during blinking.

Next, the movement of the upper eyelid during blinking will be described with reference to FIG. 4. FIG. 4 is a schematic diagram illustrating a normal movement of an upper eyelid during blinking. When a blink occurs, the upper eyelid outline moves significantly downward (in the direction of a lower eyelid). As shown in FIG. 4, the y component of the vector $R_U$ indicating a trajectory of a change in the position of the upper eyelid outline point $P_U$ is negative. In addition, during normal blinking, the proportion of the amount of the change in the positions of the upper eyelid outline candidate line $p_U$ and the upper eyelid outline point $P_U$ to the amount of the change in the eye opening degree D is very high, for example, 95% or more.

Meanwhile, when the eye opening degree in the start of a blink is set to $D_{U1}$, and the eye opening degree when the eye opening degree D becomes smallest during blinking is set to $D_{U2}$, the amount of the change in the eye opening degree D is equal to $(D_{U1}-D_{U2})$. In addition, when the coordinates of the upper eyelid outline point $P_{U1}$ in the start of a blink is set to $(x_{U1}, y_{U1})$, and the coordinates of the upper eyelid outline point $P_{U2}$ when the eye opening degree D becomes smallest during blinking is set to $(x_{U2}, y_{U2})$, the amount of the change in the positions of the upper eyelid outline candidate line $p_U$ and the upper eyelid outline point $P_U$ is expressed by the following expression (1).

$$((x_{U2}-x_{U1})^2+(y_{U2}-y_{U1})^2)^{1/2} \tag{1}$$

When the amount of the change in the positions of the upper eyelid outline candidate line $p_U$ and the upper eyelid outline point $P_U$ calculated by the eyelid outline determination unit 11 does not match the normal movement of the upper eyelid during blinking, there is a high possibility of the eyelid outline detection unit 10 detecting something other than the upper eyelid outline as the upper eyelid outline candidate line $p_U$.

Figure 5:
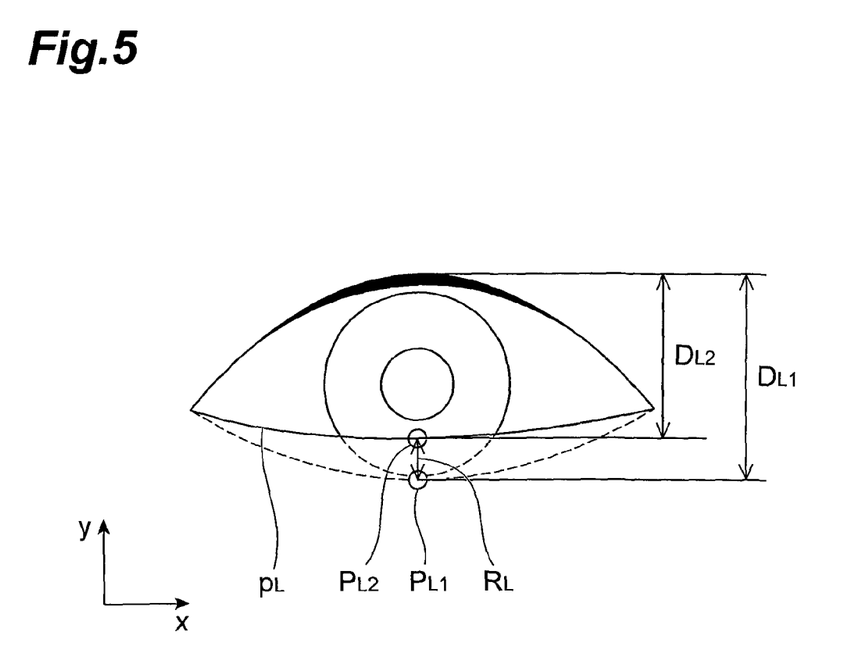
FIG. 5 is a schematic diagram illustrating a movement of a lower eyelid outline during blinking.

Next, the movement of the lower eyelid during blinking will be described with reference to FIG. 5. FIG. 5 is a schematic diagram illustrating a movement of the lower eyelid outline during blinking. When a blink occurs, the lower eyelid outline hardly moves, or moves slightly upward (in the direction of the upper eyelid). Meanwhile, in FIG. 5, for convenience of illustration, the amount of the change in the position of the lower eyelid outline is indicated greater than in normal blinking. As shown in FIG. 5, the y component of the vector $R_L$ indicating a trajectory of a change in the positions of the lower eyelid outline candidate line $p_L$ and the lower eyelid outline point $P_L$ is positive. In addition, during normal blinking, the proportion of the amount of the change in the positions of the lower eyelid outline candidate line $p_L$ and the lower eyelid outline point $P_L$ to the amount of the change in the eye opening degree D is very small, for example, less than 5%.

Meanwhile, when the eye opening degree in the start of a blink is set to $D_{L1}$, and the eye opening degree when the eye opening degree D becomes smallest during blinking is set to $D_{L2}$, the amount of the change in the eye opening degree D is equal to $(D_{L1}-D_{L2})$. In addition, when the coordinates of the lower eyelid outline point $P_{L1}$ in the start of a blink is set to $(x_{L1}, y_{L1})$, and the coordinates of the lower eyelid outline point $P_{L2}$ when the eye opening degree D becomes smallest during blinking is set to $(x_{L2}, y_{L2})$, the amount of the change in the positions of the lower eyelid outline candidate line $p_L$ and the lower eyelid outline point $P_L$ is expressed by the following expression (2).

$$((x_{L2}-x_{L1})^2+(y_{L2}-y_{L1})^2)^{1/2} \tag{2}$$

When the amount of the change in the positions of the lower eyelid outline candidate line $p_L$ and the lower eyelid outline point $P_L$ calculated by the eyelid outline determination unit 11 does not match the normal movement of the lower eyelid during blinking, there is a high possibility of the eyelid outline detection unit 10 detecting something other than the lower eyelid outline as the lower eyelid outline candidate line $p_L$.

Figure 6:
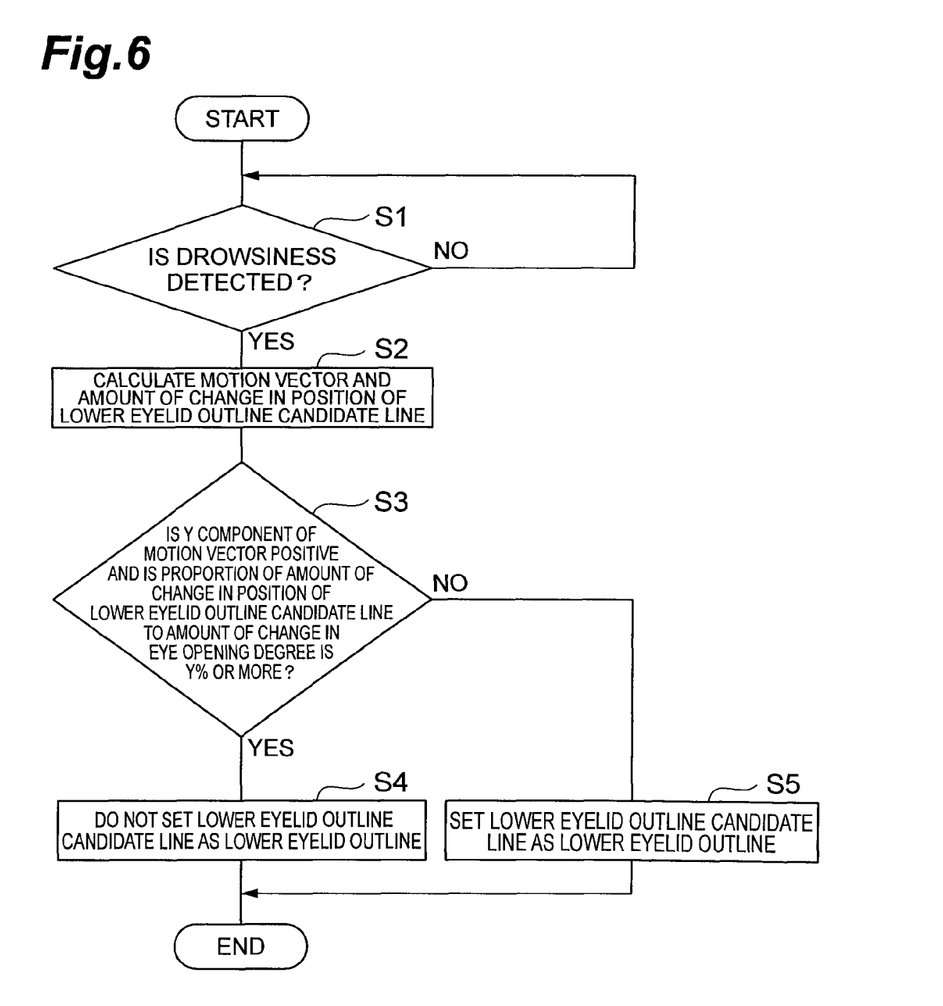
FIG. 6 is a flow diagram illustrating a processing procedure performed by an eyelid outline determination unit and an eyelid outline setting unit in a setting process of the lower eyelid outline.

Subsequently, a determination process through the eyelid outline determination unit 11, a setting process through the eyelid outline setting unit 12, and a drowsiness estimation process through the drowsiness estimation unit 20 will be described in detail with reference to FIGS. 6 to 9. First, the setting process of the lower eyelid outline in the image processing device 1 will be described with reference to FIG. 6. FIG. 6 is a flow diagram illustrating a processing procedure in the eyelid outline determination unit 11 and the eyelid outline setting unit 12. The eyelid outline determination unit 11 attempts to detect a blink on the basis of the upper eyelid outline candidate line $p_U$ and the lower eyelid outline candidate line $p_L$ detected by the eyelid outline detection unit 10 (S1). When the blink is detected, the processing procedure proceeds to step S2. On the other hand, when the blink is not detected, the detection process of step S1 is repeatedly performed.

Next, the eyelid outline determination unit 11 calculates the motion vector and the amount of the change in the position of the lower eyelid outline candidate line $p_L$ (lower eyelid outline points $P_{L1}$ and $P_{L2}$) during blinking B (S2) (see FIG. 5). Subsequently, the eyelid outline determination unit 11 assesses whether the y component of the motion vector calculated in step S2 is positive and the proportion of the amount of the change in the position of the lower eyelid outline candidate line $p_L$ calculated in step S2 to the amount of the change in the eye opening degree D is Y % or more (S3). Herein, Y % which is a value used in the assessment can be set to, for example, 5%. In addition, this assessment process constitutes "a process of determining whether the amount of the change in the position of the lower eyelid outline candidate line is a first predetermined value or more which is previously set" in the present invention.

When it is determined that the y component of the motion vector of the position of the lower eyelid outline candidate line $p_L$ is positive, and that the proportion of the amount of the change in the position of the lower eyelid outline candidate line $p_L$ to the amount of the change in the eye opening degree D is Y % or more, the eyelid outline setting unit 12 does not set the lower eyelid outline candidate line $p_L$ as the lower eyelid outline (S4). On the other hand, when it is not determined that the y component of the motion vector of the position of the lower eyelid outline candidate line $p_L$ is positive, and that the proportion of the amount of the change in the position of the lower eyelid outline candidate line $p_L$ to the amount of the change in the eye opening degree D is Y % or more, the eyelid outline setting unit 12 sets the lower eyelid outline candidate line $p_L$ as the lower eyelid outline (S5).

Meanwhile, the processing procedure shown in the flow diagram of FIG. 6 is repeatedly performed. Therefore, when the lower eyelid outline candidate line $p_L$ is not set to the lower eyelid outline in step S4 of the processing procedure performed at one time, the lower eyelid outline candidate line which is set as the lower eyelid outline in repetition of the previous processing procedure may be adopted as the lower eyelid outline again.

According to the process described with reference to the flow diagram of FIG. 6, it is determined whether the amount of the change in the position of the lower eyelid outline candidate line matches the normal movement of the lower eyelid during blinking, depending on whether the y component of the motion vector of the position of the lower eyelid outline candidate line $p_L$ is positive and the proportion of the amount of the change in the position of the lower eyelid outline candidate line $p_L$ to the amount of the change in the eye opening degree D is Y % or more. When it is determined that the change in the position of the lower eyelid outline candidate line $p_L$ does not match the normal movement of the lower eyelid during blinking, there is a high possibility of the eyelid outline detection unit 10 detecting something other than the lower eyelid outline as the lower eyelid outline candidate line $p_L$, and thus the eyelid outline setting unit 12 does not set the lower eyelid outline candidate line $p_L$ as the lower eyelid outline. Therefore, it is possible to reliably reduce false detection of the lower eyelid from the face image. Meanwhile, an example of something other than the lower eyelid outline falsely detected as the lower eyelid outline candidate line $p_L$ by the eyelid outline detection unit 10 includes an upper edge of the pupil.

Meanwhile, in the process described with reference to the flow diagram of FIG. 6, although the motion vector and the amount of the change in the position of the lower eyelid outline candidate line $p_L$ are used in the assessment, only the amount of the change may be used in the assessment without using the motion vector in the assessment.

Figure 7:
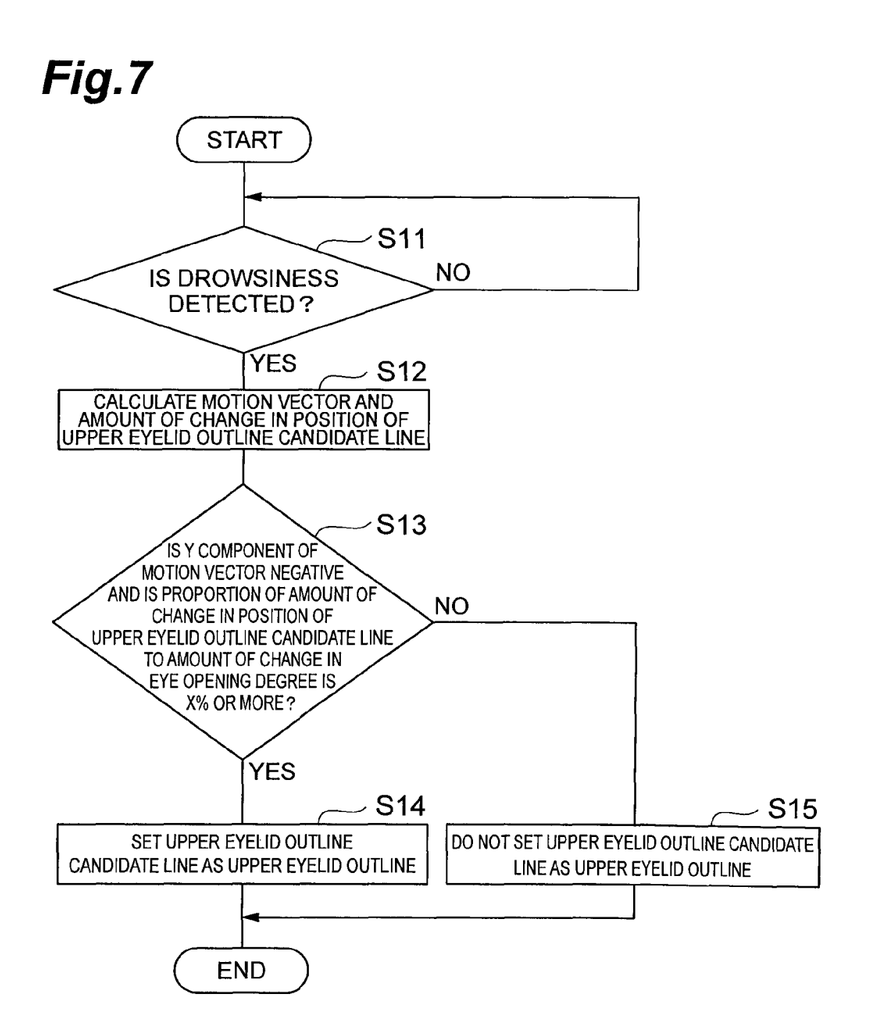
FIG. 7 is a flow diagram illustrating a processing procedure performed by the eyelid outline determination unit and the eyelid outline setting unit in a setting process of an upper eyelid outline.

Next, a setting process of the upper eyelid outline in the image processing device 1 will be described with reference to FIG. 7. FIG. 7 is a flow diagram illustrating a processing procedure in the eyelid outline determination unit 11 and the eyelid outline setting unit 12. First, the eyelid outline determination unit 11 attempts to detect a blink on the basis of the upper eyelid outline candidate line $p_U$ and the lower eyelid outline candidate line $p_L$ detected by the eyelid outline detection unit 10 (S11). When the blink is detected, the processing procedure proceeds to step S12. On the other hand, when the blink is not detected, the detection process of step S11 is repeatedly performed.

Next, the eyelid outline determination unit 11 calculates the motion vector and the amount of the change in the position of the upper eyelid outline candidate line $p_U$ (upper eyelid outline points $P_{U1}$ and $P_{U2}$) during blinking B (S12) (see FIG. 4). Subsequently, the eyelid outline determination unit 11 assesses whether the y component of the motion vector calculated in step S2 is negative and the proportion of the amount of the change in the position of the upper eyelid outline candidate line $p_U$ calculated in step S2 to the amount of the change in the eye opening degree D is X % or more (S13). Herein, X % which is a value used in the assessment can be set to, for example, 95%. In addition, this assessment process constitutes "a process of determining whether the amount of the change in the position of the upper eyelid outline candidate line is a second predetermined value or more which is previously set" in the present invention.

When it is determined that the y component of the motion vector of the position of the upper eyelid outline candidate line $p_U$ is negative, and that the proportion of the amount of the change in the position of the upper eyelid outline candidate line $p_U$ to the amount of the change in the eye opening degree D is X % or more, the eyelid outline setting unit 12 sets the upper eyelid outline candidate line $p_U$ as the upper eyelid outline (S14). On the other hand, when it is not determined that the y component of the motion vector of the position of the upper eyelid outline candidate line $p_U$ is negative, and that the proportion of the amount of the change in the position of the upper eyelid outline candidate line $p_U$ to the amount of the change in the eye opening degree D is X % or more, the eyelid outline setting unit 12 does not set the upper eyelid outline candidate line $p_U$ as the upper eyelid outline (S15).

Meanwhile, the processing procedure shown in the flow diagram of FIG. 7 is repeatedly performed. Therefore, when the upper eyelid outline candidate line $p_U$ is not set to the upper eyelid outline in step S15 of the processing procedure performed at one time, the upper eyelid outline candidate line which is set as the upper eyelid outline in repetition of the previous processing procedure may be adopted as the upper eyelid outline again.

According to the process described with reference to the flow diagram of FIG. 7, it is determined whether the amount of the change in the position of the upper eyelid outline candidate line matches the normal movement of the upper eyelid during blinking, depending on whether the y component of the motion vector of the position of the upper eyelid outline candidate line $p_U$ is negative and the proportion of the amount of the change in the position of the upper eyelid outline candidate line $p_U$ to the amount of the change in the eye opening degree D is X % or more. When it is determined that the change in the position of the upper eyelid outline candidate line $p_U$ does not match the normal movement of the upper eyelid during blinking, there is a high possibility of the eyelid outline detection unit 10 detecting something other than the upper eyelid outline as the upper eyelid outline candidate line $p_U$, and thus the eyelid outline setting unit 12 does not set the upper eyelid outline candidate line $p_U$ as the upper eyelid outline. Therefore, it is possible to reliably reduce false detection of the upper eyelid from the face image.

Meanwhile, in the process described with reference to the flow diagram of FIG. 7, although the motion vector and the amount of the change in the position of the upper eyelid outline candidate line $p_U$ are used in the assessment, only the amount of the change may be used in the assessment without using the motion vector in the assessment.

Figure 8:
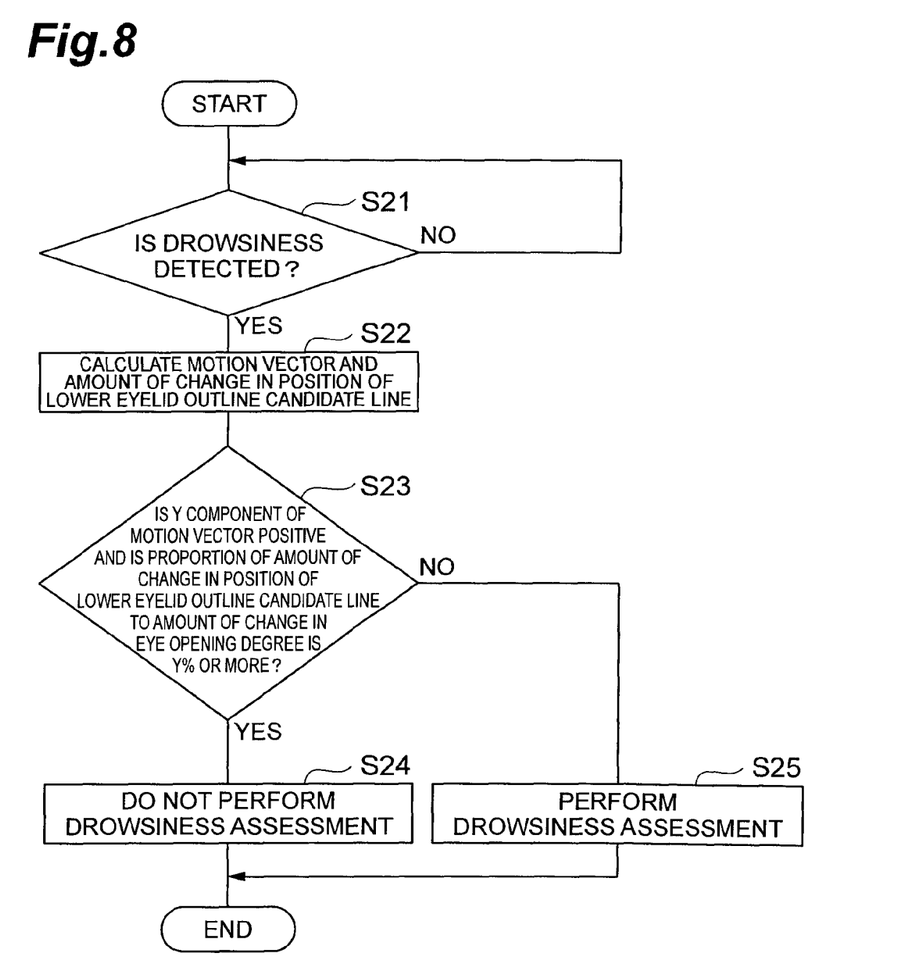
FIG. 8 is a flow diagram illustrating a processing procedure performed by the eyelid outline determination unit and a drowsiness estimation unit in an assessment process of the necessity of performing drowsiness estimation based on a change in the position of the lower eyelid outline candidate line.

Next, a process of assessing the necessity of performing a drowsiness estimation process in the drowsiness assessment device 2 will be described with reference to FIG. 8. This assessment process is performed on the basis of the change in the position of the lower eyelid outline candidate line $p_L$. FIG. 8 is a flow diagram illustrating a processing procedure in the eyelid outline determination unit 11 and the drowsiness estimation unit 20. The process details shown in steps S21 to S23 are the same as the process details of steps S1 to S3 in FIG. 6, and thus the description thereof will be omitted.

In step S23, when it is determined that the y component of the motion vector of the position of the lower eyelid outline candidate line $p_L$ is positive, and that the proportion of the amount of the change in the position of the lower eyelid outline candidate line $p_L$ to the amount of the change in the eye opening degree D is Y % or more, the drowsiness estimation unit 20 does not estimate the drowsiness of the driver (S24). On the other hand, when it is not determined that the y component of the motion vector of the position of the lower eyelid outline candidate line $p_L$ is positive, and that the proportion of the amount of the change in the position of the lower eyelid outline candidate line $p_L$ to the amount of the change in the eye opening degree D is Y % or more, the drowsiness estimation unit 20 estimates the drowsiness of the driver (S25).

According to the process described with reference to the flow diagram of FIG. 8, it is determined whether the amount of the change in the position of the lower eyelid outline candidate line matches the normal movement of the lower eyelid during blinking, depending on whether the y component of the motion vector of the position of the lower eyelid outline candidate line $p_L$ is positive and the proportion of the amount of the change in the position of the lower eyelid outline candidate line $p_L$ to the amount of the change in the eye opening degree D is Y % or more. When it is determined that the change in the position of the lower eyelid outline candidate line $p_L$ does not match the normal movement of the lower eyelid during blinking, there is a high possibility of the eyelid outline detection unit 10 detecting something other than the lower eyelid outline as the lower eyelid outline candidate line $p_L$, and thus the drowsiness estimation unit 20 does not estimate the drowsiness of the driver. Therefore, it is possible to reliably prevent a false estimation of drowsiness.

Meanwhile, in the process described with reference to the flow diagram of FIG. 8, although the motion vector and the amount of the change in the position of the lower eyelid outline candidate line $p_L$ are used in the assessment, only the amount of the change may be used in the assessment without using the motion vector in the assessment.

Figure 9:
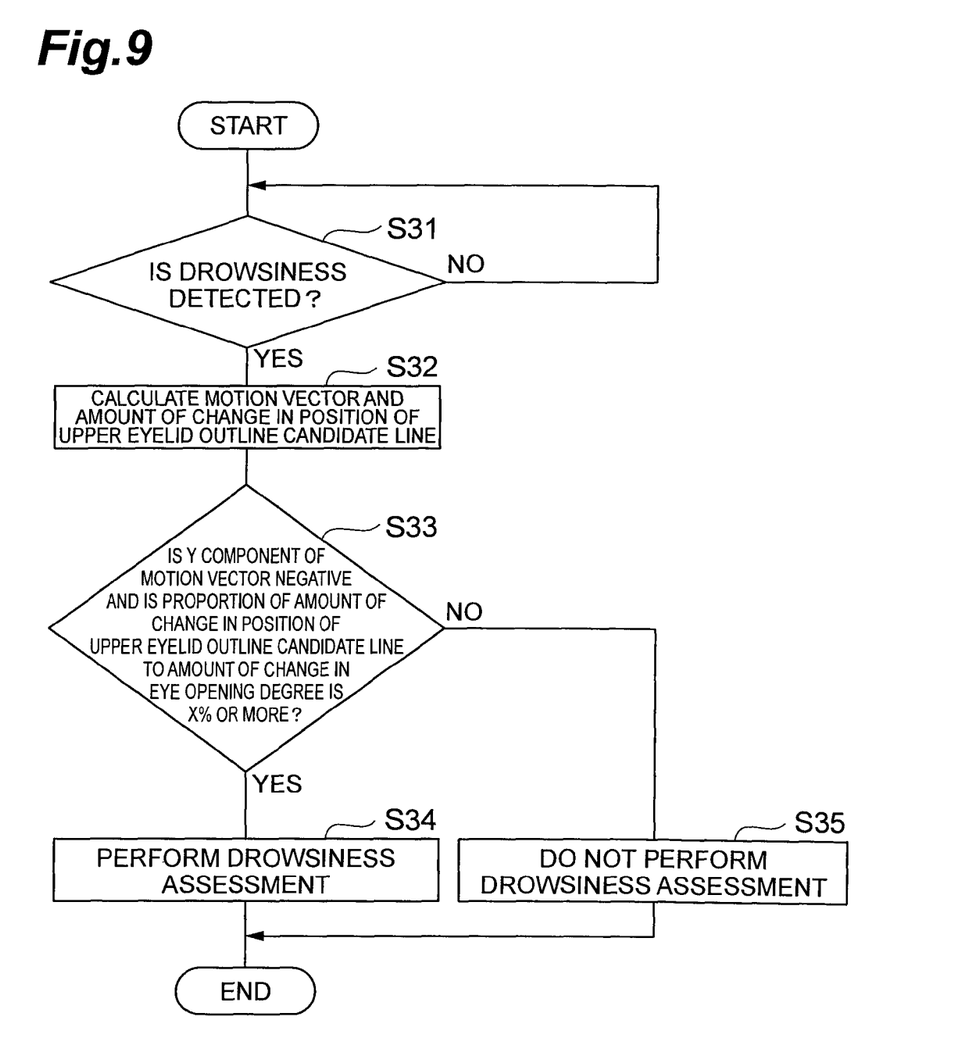
FIG. 9 is a flow diagram illustrating a processing procedure performed by the eyelid outline determination unit and the drowsiness estimation unit in the assessment process of the necessity of performing drowsiness estimation based on a change in the position of the upper eyelid outline candidate line.

Next, a process of assessing the necessity of performing a drowsiness estimation process in the drowsiness assessment device 2 will be described with reference to FIG. 9. This assessment process is performed on the basis of the change in the position of the upper eyelid outline candidate line $p_U$. FIG. 9 is a flow diagram illustrating a processing procedure in the eyelid outline determination unit 11 and the drowsiness estimation unit 20. The process details in steps S31 to S33 are the same as the process details of steps S11 to S13 in FIG. 7, and thus the description thereof will be omitted.

In step S33, when it is determined that the y component of the motion vector of the position of the upper eyelid outline candidate line $p_U$ is negative, and that the proportion of the amount of the change in the position of the upper eyelid outline candidate line $p_U$ to the amount of the change in the eye opening degree D is X % or more, the drowsiness estimation unit 20 estimates the drowsiness of the driver (S34). On the other hand, when it is not determined that the y component of the motion vector of the position of the upper eyelid outline candidate line $p_U$ is negative, and that the proportion of the amount of the change in the position of the upper eyelid outline candidate line $p_U$ to the amount of the change in the eye opening degree D is X % or more, the drowsiness estimation unit 20 does not estimate the drowsiness of the driver (S35).

According to the process described with reference to the flow diagram of FIG. 9, it is determined whether the amount of the change in the position of the upper eyelid outline candidate line matches the normal movement of the upper eyelid during blinking, depending on whether the y component of the motion vector of the position of the upper eyelid outline candidate line $p_U$ is positive and the proportion of the amount of the change in the position of the upper eyelid outline candidate line $p_U$ to the amount of the change in the eye opening degree D is X % or more. When it is determined that the change in the position of the upper eyelid outline candidate line $p_U$ does not match the normal movement of the upper eyelid during blinking, there is a high possibility of the eyelid outline detection unit 10 detecting something other than the upper eyelid outline as the upper eyelid outline candidate line $p_U$, and thus the drowsiness estimation unit 20 does not estimate the drowsiness of the driver. Therefore, it is possible to reliably prevent a false estimation of drowsiness.

Meanwhile, in the process described with reference to the flow diagram of FIG. 9, although the motion vector and the amount of the change in the position of the upper eyelid outline candidate line $p_U$ are used in the assessment, only the amount of the change may be used in the assessment without using the motion vector in the assessment.

In this manner, the present invention has been described in detail on the basis of the embodiment thereof. However, the present invention is not limited to the above-mentioned embodiment. In the present invention, various modifications and changes may be made without departing from the scope of the invention.

In the drowsiness assessment device 2 of the present embodiment, the drowsiness estimation unit 20 acquires information of the upper eyelid outline and the lower eyelid outline from the eyelid outline setting unit 12, estimates drowsiness on the basis of the change in the positions of the upper eyelid outline and the lower eyelid outline, and acquires the result of the determination process from the eyelid outline determination unit 11, but is not limited thereto. For example, the drowsiness assessment device 2 may not include the eyelid outline setting unit 12. In this case, the drowsiness assessment device 2 can acquire information of the upper eyelid outline candidate line and the lower eyelid outline candidate line from the eyelid outline detection unit 10, estimate drowsiness on the basis of the change in the positions of the upper eyelid outline candidate line and the lower eyelid outline candidate line, and assess the necessity of performing the drowsiness estimation process on the basis of the result of the determination process from the eyelid outline determination unit 11.

According to the image processing device 1 of the present embodiment as described above, it is determined whether the amount of the change in the position of the upper eyelid outline candidate line or the lower eyelid outline candidate line during blinking matches the normal movement of the upper eyelid or the lower eyelid during blinking. When it is determined that the amount of the change in the position of the lower eyelid outline candidate line does not match the normal movement of the lower eyelid during blinking, there is a high possibility of the lower eyelid outline candidate line being something other than the lower eyelid outline which is falsely detected. In this case, since the lower eyelid outline candidate line is not set as the lower eyelid outline, it is possible to reduce false detection of the lower eyelid from the face image. In addition, when it is not determined that the amount of the change in the position of the upper eyelid outline candidate line matches the normal movement of the upper eyelid during blinking, there is a high possibility of the upper eyelid outline candidate line being something other than the upper eyelid outline which is falsely detected. In this case, since the upper eyelid outline candidate line is not set as the upper eyelid outline, it is possible to reduce false detection of the upper eyelid from the face image.

In addition, according to the drowsiness assessment device 2 of the present embodiment, it is determined whether the amount of the change in the position of the upper eyelid outline candidate line or the lower eyelid outline candidate line during blinking matches the normal movement of the upper eyelid or the lower eyelid during blinking. When it is determined that the amount of the change in the position of the lower eyelid outline candidate line does not match the normal movement of the lower eyelid during blinking, there is a high possibility of the lower eyelid outline candidate line being something other than the lower eyelid outline which is falsely detected. In addition, when it is not determined that the amount of the change in the position of the upper eyelid outline candidate line matches the normal movement of the upper eyelid during blinking, there is a high possibility of the upper eyelid outline candidate line being something other than the upper eyelid outline which is falsely detected. In these cases, since the drowsiness of the driver is not estimated, it is possible to prevent a false estimation of drowsiness.

INDUSTRIAL APPLICABILITY

According to the present invention, it is possible to reduce false detection of the eyelid from the face image, and to prevent a false estimation of drowsiness.

REFERENCE SIGNS LIST

1: image processing device
2: drowsiness assessment device
10: eyelid outline detection unit
10: face image sensor
10: eyelid outline detection unit
11: eyelid outline determination unit
12: eyelid outline setting unit
20: drowsiness estimation unit
21: warning unit
30: face image sensor

The invention claimed is:

1. A drowsiness assessment device installed in a vehicle and that assesses drowsiness of a driver, comprising:
an eyelid outline detection unit configured to detect an eyelid outline candidate line from a face image, the candidate line being a candidate of an eyelid outline;
an eyelid outline determination unit configured to determine whether or not an amount of displacement of the candidate line when blinking is within a preset range of an amount of displacement of the eyelid outline when blinking normally;
an eyelid outline setting unit configured to set the candidate line as the eyelid outline, on the basis of a determination result of the eyelid outline determination unit; and
a drowsiness estimation unit configured to estimate the drowsiness of the driver, on the basis of an amount of displacement of upper and lower eyelid outlines that are set by the eyelid outline setting unit,
wherein the eyelid outline setting unit sets the candidate line as the eyelid outline when it is determined by the eyelid outline determination unit that the amount of displacement of the candidate line is within the preset range, and does not set the candidate line as the eyelid outline when it is determined by the eyelid outline determination unit that the amount of displacement of the candidate line is not within the preset range, and
the drowsiness estimation unit does not perform an estimation of the drowsiness of the driver, when it is determined by the eyelid outline determination unit that the amount of displacement of the candidate line is not within the preset range.

2. The drowsiness assessment device according to claim 1, wherein the eyelid outline detection unit detects a lower eyelid outline candidate line that is a candidate of a lower eyelid outline,
the eyelid outline determination unit determines whether or not Han an amount of displacement of the lower eyelid outline candidate line when blinking is a preset first predetermined value or more, and
the drowsiness estimation unit does not estimate the drowsiness of the driver, when it is determined by the eyelid outline determination unit that the amount of displacement of the lower eyelid outline candidate line is the first predetermined value or more.

3. The drowsiness assessment device according to claim 1, wherein the eyelid outline detection unit detects an upper eyelid outline candidate line that is a candidate of an upper eyelid outline,
the eyelid outline determination unit determines whether or not an amount of displacement of the upper eyelid outline candidate line when blinking is a preset second predetermined value or more, and
the drowsiness estimation unit does not estimate the drowsiness of the driver, when it is not determined by the eyelid outline determination unit that the amount of displacement of the upper eyelid outline candidate line is the second predetermined value or more.

4. The drowsiness assessment device according to claim 1, wherein the eyelid outline determination unit detects a blink on the basis of a change in an eye opening degree, which is a distance between an upper eyelid outline candidate line and a lower eyelid outline candidate line.

* * * * *